US009648301B2

(12) United States Patent
Lee

(10) Patent No.: US 9,648,301 B2
(45) Date of Patent: May 9, 2017

(54) IMAGE PROCESSING SYSTEM BASED ON STEREO IMAGE

(71) Applicant: Moon Key Lee, Seoul (KR)

(72) Inventor: Moon Key Lee, Seoul (KR)

( * ) Notice: Subject to any disclaimer, the term of this patent is extended or adjusted under 35 U.S.C. 154(b) by 172 days.

(21) Appl. No.: 14/347,315

(22) PCT Filed: Sep. 29, 2012

(86) PCT No.: PCT/KR2012/007973
§ 371 (c)(1),
(2) Date: Mar. 26, 2014

(87) PCT Pub. No.: WO2013/048221
PCT Pub. Date: Apr. 4, 2013

(65) Prior Publication Data
US 2014/0232829 A1    Aug. 21, 2014

(30) Foreign Application Priority Data

Sep. 30, 2011  (KR) .................. 10-2011-0100381
Nov. 6, 2011   (KR) .................. 10-2011-0114866

(51) Int. Cl.
*H04N 5/76*     (2006.01)
*H04N 13/02*    (2006.01)
*G06T 19/00*    (2011.01)
*H04N 13/04*    (2006.01)

(52) U.S. Cl.
CPC ......... *H04N 13/025* (2013.01); *G06T 19/006* (2013.01); *H04N 13/0431* (2013.01); *H04N 13/0434* (2013.01); *H04N 13/0438* (2013.01); *H04N 13/044* (2013.01)

(58) Field of Classification Search
None
See application file for complete search history.

(56) References Cited

U.S. PATENT DOCUMENTS

| 2004/0201575 | A1 | 10/2004 | Morrison |
| 2005/0151838 | A1* | 7/2005 | Fujita ................. G06T 1/00 348/39 |
| 2006/0077284 | A1* | 4/2006 | Kurosawa ........... H04N 5/2354 348/371 |
| 2008/0285854 | A1* | 11/2008 | Kotake ................ G06T 7/0042 382/190 |

(Continued)

FOREIGN PATENT DOCUMENTS

| CN | 1784649 A | 6/2006 |
| JP | 63-214095 A | 9/1988 |

(Continued)

OTHER PUBLICATIONS

Japanese Patent Office; Office Action in Japanese Patent Application No. 2014-533221 (Jun. 9, 2015).

(Continued)

*Primary Examiner* — Eileen Adams
(74) *Attorney, Agent, or Firm* — Leydig, Voit & Mayer, Ltd.

(57) ABSTRACT

The present invention relates to an image processing system for pointing or making an augmented reality image by selectively capturing a left or right image of a stereo image of a 3D display, and detecting a mark from the captured image.

13 Claims, 1 Drawing Sheet

(56) References Cited

U.S. PATENT DOCUMENTS

| | | | | |
|---|---|---|---|---|
| 2008/0315072 A1* | 12/2008 | Tholl | ............... | H04N 9/045 250/208.1 |
| 2010/0080447 A1* | 4/2010 | Kanazawa | ........... | G06K 9/6211 382/154 |
| 2012/0319949 A1 | 12/2012 | Lee | | |
| 2013/0187854 A1 | 7/2013 | Lee | | |

FOREIGN PATENT DOCUMENTS

| | | |
|---|---|---|
| JP | 2002-222043 A | 8/2002 |
| JP | 2009-302770 A | 12/2009 |
| KR | 10-2006-0065159 A | 6/2006 |
| KR | 10-2008-0104100 A | 12/2008 |
| KR | 10-2011-0099176 A | 9/2011 |
| KR | 10-2011-0104676 A | 9/2011 |
| KR | 10-2011-0132260 A | 12/2011 |

OTHER PUBLICATIONS

State Intellectual Property Office of the Peoples's Republic of China; Office Action in Chinese Patent Application No. 201280047284.9 (May 6, 2015).

\* cited by examiner

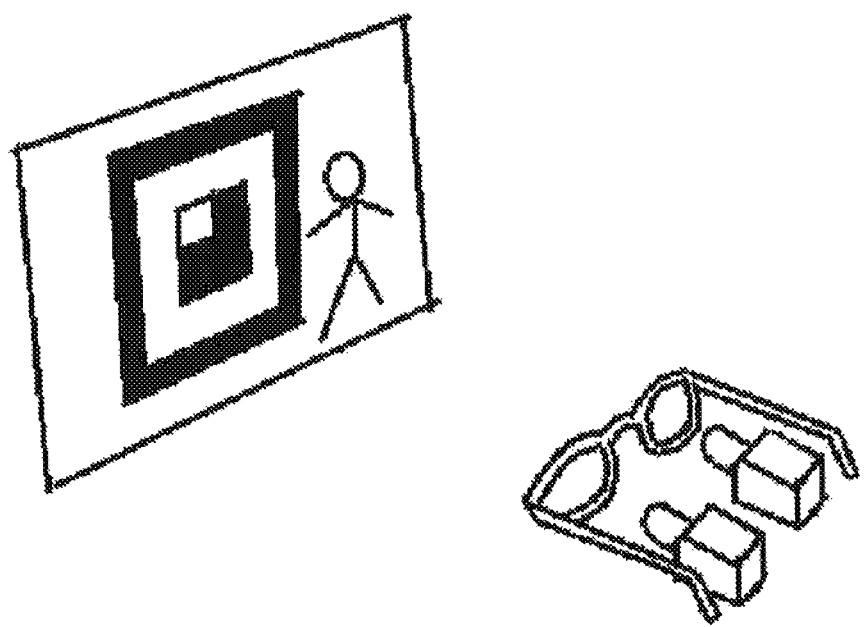

IMAGE PROCESSING SYSTEM BASED ON STEREO IMAGE

TECHNICAL FIELD

The present invention relates to image processing system for pointing or making augmented reality image by selectively capturing left or right image of stereo image of 3D display and detecting mark from the captured image.

BACKGROUND ART

The present invention relates to image processing system for pointing or making augmented reality image using 3D display.

DETAILED DESCRIPTION OF THE INVENTION

Technical Problem

There is the Korean patent: its registration number is 10-0936816 and title of the invention is 'POINTING DEVICE USING CAMERA AND OUTPUTTING MARK' which is about a pointing device by capturing and detecting mouse cursor icon displayed on computer monitor. The mouse cursor or mark displayed on monitor can be detected by image processing means for pointing task. It has the weakness that detecting mark is difficult if the color of mark and background is similar.

There is the invention: its Korean patent application number is 10-2011-0050980 and the title is 'MONITOR BASED AUGMENTED REALITY SYSTEM'. this invention is relates to capturing image of mouse cursor icon or mark displayed on monitor, detecting mark and calculating the 3-dimensional relative position between camera and mark by image processing means for synthesizing the augmented reality image. This invention also has the same weakness if the color of mark and the background is similar.

Technical Solution

The present invention provides the image processing system for fast and stably detecting mark from the captured image by displaying background image and mark image as stereo image with 3D display, capturing the mark image and detecting the mark.

Advantageous Effects

By using the image processing system of present invention, it is possible to detect mark fast and stably with background image whose color is similar to the color of mark.

DESCRIPTION OF THE DRAWINGS

The FIGURE illustrates an image processing system according to an embodiment of the inventive concept.

BEST MODE

There are various types of 3D displays: shutter glass, polarization glass, active retarder, red-cyan glass. The details are as followings:

Embodiment 1

3d display of shutter glasses type displays image for left eye and image for right eye sequentially. Shutter glasses opens and closes the shutter with synchronization signal from 3D display. Wearer of the shutter glasses can watch left image with left eye and can watch right image with right eye. Such shutter glasses 3D display is commercialized by SAMSUNG. The 3D display can be LCD or beam projector.

In present embodiment, background image and mark image are sequentially displayed as left and right image of stereo image and camera captures only the mark image with shutter synchronized with the 3D display. The mark is detected from the captured image by image processing means and the augmented reality image can be synthesized with the 3-dimensional relative position between camera and mark.

The image processing means can control the outputting position of mark by moving it to the line of sight of 1st camera so that the mark is positioned at the center of captured image. By doing this, mark can be stably detected even if the 1st camera is moving. And the image processing means can detect the size of mark from the captured image and control the outputting size of mark so that the size of mark is proportional to the distance between camera and mark. The size of mark in captured image is constant. In other words, it is recommended to reduce the displayed mark size if the 1st camera is approached to the monitor and to expand the displayed mark size if the 1st camera is getting away from the monitor.

Instead of displaying left image of background and right image of mark sequentially, it is also possible to display left image of 1st background, right image of 2nd background and the 3rd image of mark sequentially and capturing the only 3rd image to detect mark from the captured image and use the detected information for pointing or augmented reality. Wearer of shutter glasses that passes the only the left and right image and blocks the 3rd mark image can watch the only background image and cannot watch the mark. In this case the left and right image can be ordinary 3D stereo image.

MODE OF THE INVENTION

Embodiment 2

Polarization glasses type 3D display is a display composed of thin horizontal lines. The odd lines and even lines have different polarization coating. Left image and right image of stereo image are displayed at the even and odd lines respectively. Even and odd lines have different phase retarder coating so that the beam passing through the even and odd lines can be polarized as different circular polarization. Such a display is called patterned retarder type. Wearer of the polarization glasses can watch the 3D stereo image displayed by the above polarization 3D display. In other words, the left lens of glasses passes only the beam from even lines and right lens of glasses passes only the beam from the odd lines. Such a display can be LCD or beam projector. For beam projector, left image beam and right image beam is projected at the same time and onto the same screen where the left and right beam have the different polarization. It is recommended to use silver screen to reflect the polarized beam.

By displaying the background image and mark image as stereo image with the polarization type 3D display, capturing the only such mark image with polarization filter in front of camera, and detecting the mark from the captured image and calculating the 3D relative position between mark and camera, such 3D relative position can be used for pointing task or synthesizing the augmented reality image.

Embodiment 3

There are active retarder type 3D display which is the combination of shutter glasses type and the polarization glasses type. The active retarder 3D display system uses the polarization glasses instead of shutter glasses to remove the battery for shutter glasses. It can overcome the low resolution problem of patterned retarder polarization type 3D display. The active retarder system utilizes the electrically controllable phase retarder installed in front of display which displays the left and right image of stereo image sequentially. Left and right image can be polarized differently by controlling the phase retarder with synchronization signal from monitor. Wearer of polarization glasses can watch the 3D stereo image with the active retarder type 3D display.

Such active retarder display can be LCD or beam projector. For beam projector, left and right image beams are projected sequentially with different polarization. It is recommended to use silver screen to reflect the polarized beam.

By displaying the background image and mark image as stereo image with the active retarder type 3D display, capturing the only such mark image with polarization filter in front of camera, detecting the mark from the captured image and calculating the 3D relative position between mark and camera, such 3D relative position can be used for pointing task or synthesizing the augmented reality image.

Embodiment 4

Wearer of red-cyan glass can watch 3D stereo image with monitor displaying color image whose red component is left image of stereo image and cyan component is right image of stereo image.

By displaying color image whose red component is background image and cyan component is mark image, capturing the displayed mark image with cyan color filter in front of camera, detecting the mark from the captured image and calculating the 3D relative position between mark and camera, such 3D relative position can be used for pointing task or synthesizing the augmented reality image.

There is dolby glasses type 3 display which is similar to the red-cyan glass type. Left and right lens of dolby glasses have slightly different set of red, green, blue filter. By outputting left image in 1st set of color and right image in 2nd set of color, wearer of dolby glasses can watch the stereo 3D image in full color.

Embodiment 5

It is possible to construct an augmented reality system by adding a 2nd camera into the composition of embodiments 1~4 as shown in the FIGURE. In such an augmented reality system, the 1st camera of embodiments 1~4 captures only the mark image with a filter or a shutter and an image processing means calculates the third dimensional relative position between the camera and the mark. The additional 2nd camera captures only the background image with a filter or a shutter and the image processing means synthesizes the augmented reality image by adding a graphic object onto the captured background image with the calculated third dimensional relative position information. The synthesized augmented reality image is more realistic because it does not contain the mark. It is recommended to fix the relative position between the two cameras. The two cameras can be contained in smart phones or a head mounted display. A head mounted display with cameras is commercialized as WRAP 920AR+ (http://www.vuzix.com/consumer/products_wrap920ar.html). One camera of such a head mounted display can capture only the mark and another camera can capture the background image without the mark and the synthesized augmented image can be displayed by the head mounted display.

Embodiment 6

Camera of embodiment 1~4 can be a gun shape for pointing task and the glasses can block the mark image and pass the background image with polarization filter or shutter lens. For example, by displaying shooting game scene as background image for left eye and mouse cursor icon as mark image for right eye on 3D display, capturing only mark image by gun shaped camera with filter or shutter, and detecting mark from the captured image by image processing means, user can play shooting game. It is recommended to wear shutter of polarization glasses which blocks the mark image but pass background image.

Embodiment 7

Video-through head mount display of embodiment 5 can be replaced with the transparent See-Thru Augmented Reality Display. In this case, the 2nd camera of embodiment 5 can be omitted. Such a transparent head mount display is commercialized as STAR 1200 (http://www.vuzix.com/ar/products_star1200.html). By capturing the mark image with the camera attached to such a transparent head mount display, and detecting the mark from the captured image by image processing means, graphic object of augmented reality can be displayed on the transparent display. Filter or shutter can be attached to the transparent display in order to block the mark image and pass the background image. By doing so, user can watch the graphic object of augmented reality with background image which does not contain mark image.

The invention claimed is:

1. An image processing system comprising:
    a 3D display displaying a stereo image comprising a mark image, which includes a mark, and a background image:
    one of a shutter means, a polarization filter, and a color selection means distinguishing the mark image which is displayed on the 3D display from the background image which is displayed on the 3D display;
    a first camera capturing only the mark image which is displayed on the 3D display from the stereo image via the one of the shutter means, the polarization filter, and the color selection means applied to the stereo image to distinguish the mark image which is displayed on the 3D display from the background image which is displayed on the 3D display; and
    an image processor detecting the mark from the mark image which is displayed on the 3D display and which has been captured by the first camera.

2. The image processing system of claim 1, wherein the image processor outputs a pointing signal or synthesizes a graphic object for an optical see-through augmented reality system.

3. The image processing system of claim 1, including a second camera capturing only the background image which is displayed on the 3D display, wherein the image processor synthesizes an augmented reality image onto the background image which is displayed on the 3D display and has been captured by the second camera, using the mark from the mark image which is displayed on the 3D display and has been captured by the first camera.

4. The image processing system according to claim 2, wherein the image processor moves position of the mark of the mark image which is displayed on the 3D display toward a gaze direction of the first camera so that the position of the mark in the mark image which is displayed on the 3D display and has been captured by the first camera remains centered in the mark image.

5. The image processing system according to claim 2, wherein the image processor adjusts size of the mark in the mark image which is displayed on the 3D display and has been captured in proportion to distance between the first camera and the mark so that the size of the mark in the mark image which is displayed on the 3D display and has been captured by the first camera remains constant.

6. The image processing system of claim 1, wherein
the 3D display outputs the mark image which is displayed on the 3D display and the background image which is displayed on the 3D display sequentially, and
the first camera captures only the mark image which is displayed on the 3D display using the shutter means.

7. The image processing system of claim 1, wherein
the 3D display outputs the mark image which is displayed on the 3D display and the background image which is displayed on the 3D display,
polarization of the mark image which is displayed on the 3D display and polarization of the background image which is displayed on the 3D display are different, and
the first camera captures only the mark image which is displayed on the 3D display using the polarization filter.

8. The image processing system of claim 1, wherein
the 3D display outputs the mark image which is displayed on the 3D display and the background image which is displayed on the 3D display,
color of the mark image which is displayed on the 3D display and color of the background image which is displayed on the 3D display are different, and
the first camera captures the mark image which is displayed on the 3D display using the color selection means.

9. The image processing system of claim 1, wherein
the 3D display outputs the mark image which is displayed on the 3D display and the background image which is displayed on the 3D display,
color of the mark image which is displayed on the 3D display and color of background image which is displayed on the 3D display are different, and
the image processor detects the mark of the mark image which is displayed on the 3D display and captured by the first camera by selecting a color component sub image, wherein color of the color component sub image selected and the color of the mark image which is displayed on the 3D display are identical.

10. An image processing method comprising:
displaying on a 3D display a stereo image comprising a mark image, which includes a mark, and a background image;
distinguishing the mark image which is displayed on the 3D display from the background image which is displayed on the 3D display using one of a shutter means, a polarization filter, and a color selection means;
capturing only the mark image which is displayed on the 3D display from the stereo image by applying the one of the shutter means, the polarization filter, and the color selection means applied to distinguish the mark image which is displayed on the 3D display from the background image which is displayed on the 3D display; and
detecting the mark of the mark image which is displayed on the 3D display and has been captured by analyzing that mark image.

11. A non-transitory computer-readable recording medium having stored thereon a computer program for executing an image processing method, wherein the image processing method comprises:
displaying on a 3D display a stereo image comprising a mark image, which includes a mark, and a background image;
distinguishing the mark image which is displayed on the 3D display from the background image which is displayed on the 3D display using one of a shutter means, a polarization filter, and a color selection means;
capturing only the mark image which is displayed on the 3D display from the stereo image by applying the one of the shutter means, the polarization filter, and the color selection means applied to distinguish the mark image which is displayed on the 3D display from the background image which is displayed on the 3D display; and
detecting the mark of the mark image which is displayed on the 3D display and has been captured by analyzing that mark image.

12. The image processing system according to claim 3, wherein the image processor moves position of the mark of the mark image which is displayed on the 3D display toward a gaze direction of the first camera so that the position of the mark in the mark image which is displayed on the 3D display and has been captured by the first camera remains centered in the mark image.

13. The image processing system according to claim 3, wherein the image processor adjusts size of the mark in the mark image which is displayed on the 3D display and has been captured in proportion to distance between the first camera and the mark so that the size of the mark in the mark image which is displayed on the 3D display and has been captured by the first camera remains constant.

* * * * *